3,174,904
METHOD OF PURIFYING SULFATED CARBOHYDRATES
James W. Sawhill, Canoga Park, Calif., assignor to Rexall Drug and Chemical Company, Los Angeles, Calif., a corporation of Delaware
No Drawing. Filed Mar. 25, 1963, Ser. No. 267,826
5 Claims. (Cl. 167—74)

The present invention is directed to a method of purifying sulfated carbohydrates and, in particular, is directed to a method of decolorizing such sulfated carbohydrates.

Sulfated carbohydrates such as heparin are generally prepared by extraction of naturally occurring materials. In the case of heparin, which is widely used in anticoagulant therapy, this material is recovered from various animal tissues, such as, beef lung, hog intestinal mucosa, and the like. In order to obtain a material of sufficient purity and potency to ensure satisfactory use in human therapy, a multi-step extraction and purification process is commonly employed.

In the copending application of Jess A. Bush et al., entitled "Method of Purifying Sulfated Carbohydrates," Serial No. 88,599, filed February 13, 1961, now U.S. Patent No. 3,135,660, there is described a method for decolorizing solutions of sulfated carbohydrates such as heparin by treatment of aqueous solutions thereof with certain oxidizing agents. Among the oxidizing agents disclosed in the aforementioned copending application are water-soluble salts of permanganic acid such as potassium permanganate. Such salts have been found to be highly effective in decolorizing aqueous sulfated carbohydrate solutions including aqueous solutions of heparin. A problem has, however, been observed in removing residual manganese from the treated material.

During the treatment of an aqueous sulfated carbohydrate solution with a water-soluble salt of permanganic acid, the salt which enters into the reaction is reduced in large measure to manganese dioxide. In addition, a small amount of manganous ion is formed. The manganese dioxide which forms is extremely difficult to remove from the aqueous heparin solution. It has been found that several days are frequently required for the finely divided precipitate to settle in a form in which it can be removed by filtration or other equivalent means. It is apparent that this long time complicates the recovery process and adds significantly to manufacturing costs.

In addition, the small amount of manganous ion which is formed is an undesirable by-product of the reaction since, if such manganous ion becomes part of the finished heparin product even in concentrations of as little as two parts per million, air oxidation of the finished heparin will tend to cause formation of a yellow color, thus yielding a heparin which fails to pass color specifications.

It is an object of the invention to provide a process of treating an aqueous solution of a sulfated carbohydrate with a water-soluble salt of permanganic acid characterized by the formation of a rapidly settling precipitate of manganese dioxide to produce an aqueous solution of decolorized sulfated carbohydrate substantially free from any residual soluble manganese.

Other objects and the advantages of the invention will become apparent from the following detailed description.

The invention sought to be patented resides in the concept of a process comprising treating an aqueous solution of a sulfated carbohydrate with a water-soluble salt of permanganic acid in which the solution contains an alkali metal or ammonium bicarbonate, thereafter adding a reducing agent in an amount sufficient to reduce excess permanganate ion to manganese dioxide and blowing an oxygen-containing gas through the mixture to yield, after separation of the precipitate which forms, an aqueous solution of decolorized sulfated carbohydrate substantially free of residual soluble manganese.

The manner and process of carrying out this invention will now be described so as to enable a person skilled in the art of sulfated carbohydrate processing to carry out and use the same as follows:

In accordance with the invention, a crude sulfated carbohydrate, such as heparin, starch sulfate, cellulose sulfate, pectic acid sulfate, mannuronic acid sulfate, arabic acid sulfate, chondroitin sulfate and the like is dissolved in water and the pH adjusted to 7 or above. It has been found that it is preferable to operate at a pH between about 7 and about 9 with a pH of about 8 being particularly effective.

The aqueous medium prior to addition of the water-soluble salt of permanganic acid, as described hereinafter, also contains an alkali metal bicarbonate, such as sodium bicarbonate, potassium bicarbonate, lithium bicarbonate, or ammonium bicarbonate. Generally the solution will contain about 1 to about 5% by weight of the bicarbonate salt with a concentration of about 3% by weight being particularly effective.

To the resulting solution is added a water-soluble salt of permanganic acid such as potassium permanganate, sodium permanganate, and the like as described in copending application Serial No. 88,599, filed February 13, 1961, and the mixture is held at a temperature of 0° C. to 70° C. during the treatment, which normally requires about 1 to about 15 hours. A reducing agent in an amount sufficient to reduce any excess soluble permanganate to manganese dioxide is then added. Any reducing agent capable of carrying out the desired reduction of permanganate may be used with formaldehyde, alkali metal bisulfites, such as sodium bisulfite, potassium bisulfite and the like, and oxalic acid being generally preferred. The amount of reducing agent to be added is readily determined by titration utilizing iodide-starch paper to determine the end-point.

After completion of the addition of the required amount of reducing agent, an oxygen-containing gas is blown through the solution. Air is an entirely acceptable oxygen-containing gas and is generally preferred. It is preferred that the oxygen-containing gas be blown through the solution for at least 15 minutes, with times up to 12 hours being utilized on occasions, the proper time being determined by a visual observation of the settling characteristics of the precipitate which forms.

The result of the foregoing sequence of steps is the formation of a rapidly settling precipitate of manganese dioxide which is readily removed by filtration or other equivalent means to produce an aqueous solution of decolorized sulfated carbohydrate. It is a particular feature of the process of the invention that the aqueous solution so produced is substantially free from any soluble manganese ion, normally containing less than one part per million of such soluble manganese. Purification of the resulting heparin solution by conventional techniques yields a heparin product which shows no tendency toward development of a yellow color due to presence of soluble manganese salts.

It has been found that the presence of an alkali metal or ammonium bicarbonate salt in the solution is of critical importance since, if the process is carried out in the presence of other salts, for example, ammonium chloride, the desirable features of a rapidly settling precipitate are not observed. In addition, the blowing of the solution with an oxygen-containing gas is essential to ensure a rapidly settling precipitate.

The best mode contemplated by the inventor for carrying out his invention will now be set forth as follows:

Example 1

Heparin (100 grams, 122 units/mg. potency) is dissolved in 2000 ml. of 3% by weight aqueous sodium bicarbonate solution, clarified by centrifugation and then treated with 40 ml. of 5% potassium permanganate solution at 2° C. After 30 minutes the solution is titrated with an aqueous sodium bisulfite solution until iodide-starch paper shows no blue coloration. Air is then bubbled through the solution for one hour. The precipitated manganese dioxide is removed by centrifugation followed by filtration. The filtrate is analyzed and shows a manganese concentration of less than 1 part per million. The heparin is recovered by methanol precipitation, acetone fractionation, isopropanol precipitation and drying. Yield is 87.7 grams at 123 units/mg. potency (an 88.4% yield).

The process of this invention is characterized by yields of high potency heparin, minimal loss of heparin in the treating process and uniformity in the time required for operation, thus providing a substantial economic advantage over the more uncertain prior art methods.

The subject matter which the applicant regards as his invention is particularly pointed out and distinctly claimed as follows.

I claim:

1. A process of decolorizing a sulfated carbohydrate comprising treating an aqueous solution of a sulfated carbohydrate with a water-soluble salt of permanganic acid at an alkaline pH in the presence of a member selected from the group consisting of an alkali metal bicarbonate and ammonium bicarbonate, adding a reducing agent in an amount sufficient to reduce excess permanganate to manganese dioxide, blowing an oxygen-containing gas through the mixture and separating the precipitate which forms thereby to produce an aqueous solution of decolorized sulfated carbohydrate.

2. A process according to claim 1 wherein said sulfated carbohydrate is heparin.

3. A process of decolorizing heparin which comprises treating an aqueous solution of heparin at a pH of about 7 to about 9 containing about 1 to about 5 percent by weight of a member selected from the group consisting of an alkali metal bicarbonate and ammonium bicarbonate with a water soluble salt of permanganic acid, adding a reducing agent in an amount sufficient to reduce excess permanganate to manganese dioxide, blowing an oxygen-containing gas through the mixture and separating the precipitate which forms thereby to produce an aqueous solution of decolorized heparin.

4. A process of decolorizing heparin which comprises treating an aqueous solution of heparin at a pH of about 8 containing about 3 percent by weight of sodium bicarbonate with potassium permanganate, adding sufficient sodium bisulfite to reduce excess permanganate to manganese dioxide, blowing air through the mixture for at least 15 minutes and separating the precipitate which forms thereby to produce an aqueous solution of decolorized heparin.

5. A process of decolorizing a sulfated carbohydrate comprising treating an aqueous solution of a sulfated carbohydrate with a water-soluble salt of permanganic acid at a pH between about 7 and about 9 in the presence of a member selected from the group consisting of an alkali metal bicarbonate and ammonium bicarbonate, adding a member selected from the group consisting of formaldehyde, an alkali metal bisulfite and oxalic acid in an amount sufficient to reduce excess permanganate to manganese dioxide, blowing an oxygen-containing gas through the mixture and separating the precipitate which forms thereby to produce an aqueous solution of decolorized sulfated carbohydrate.

No references cited.